Figure 8:
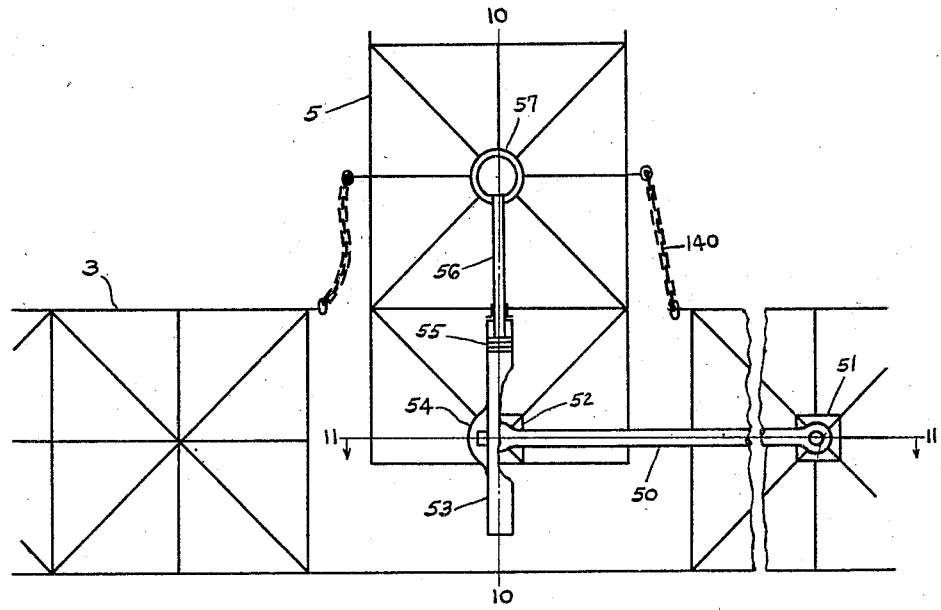

April 12, 1932. S. E. HITT 1,853,125
TWO-HULLED WATER CRAFT
Filed March 26, 1928  7 Sheets-Sheet 1
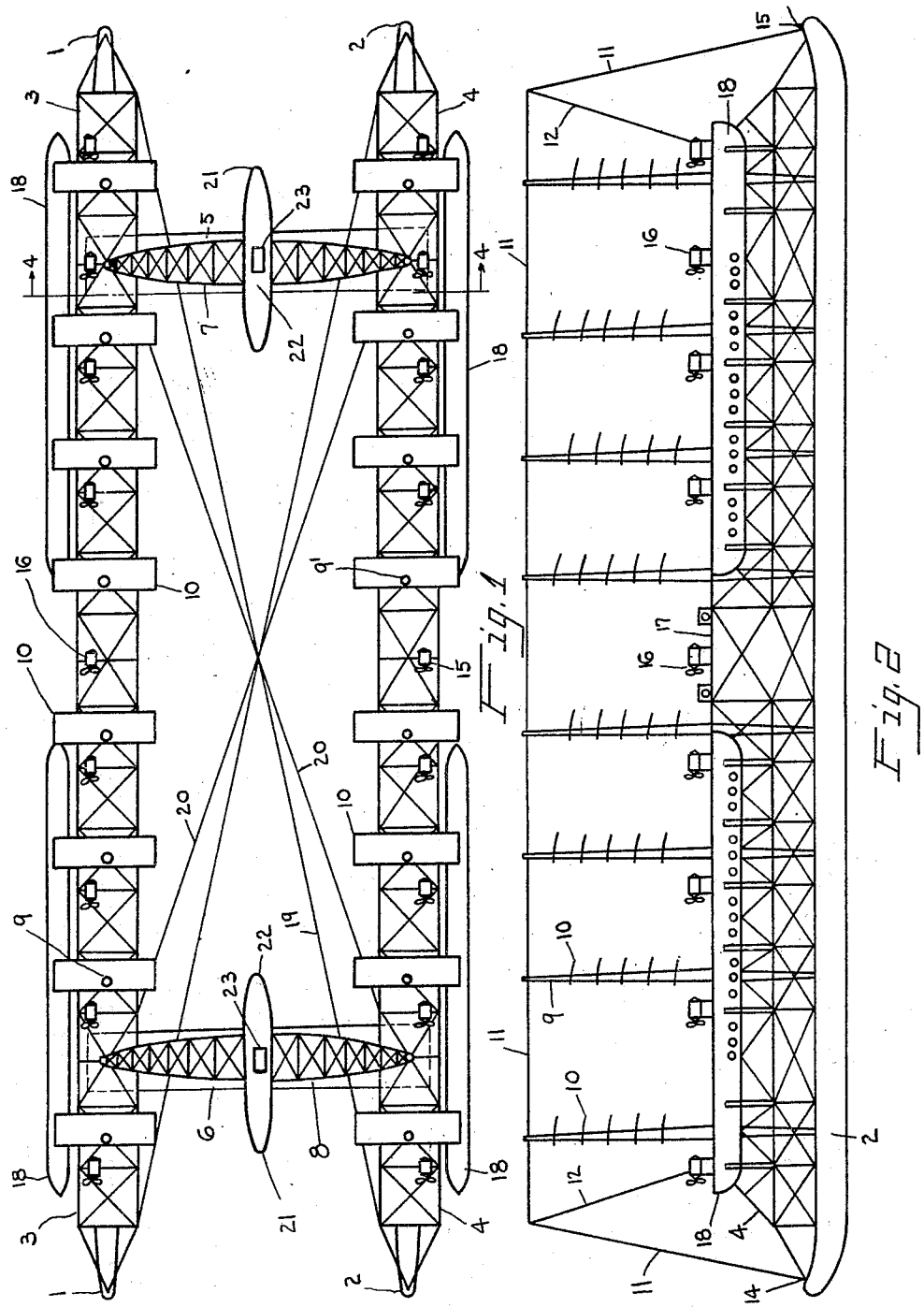

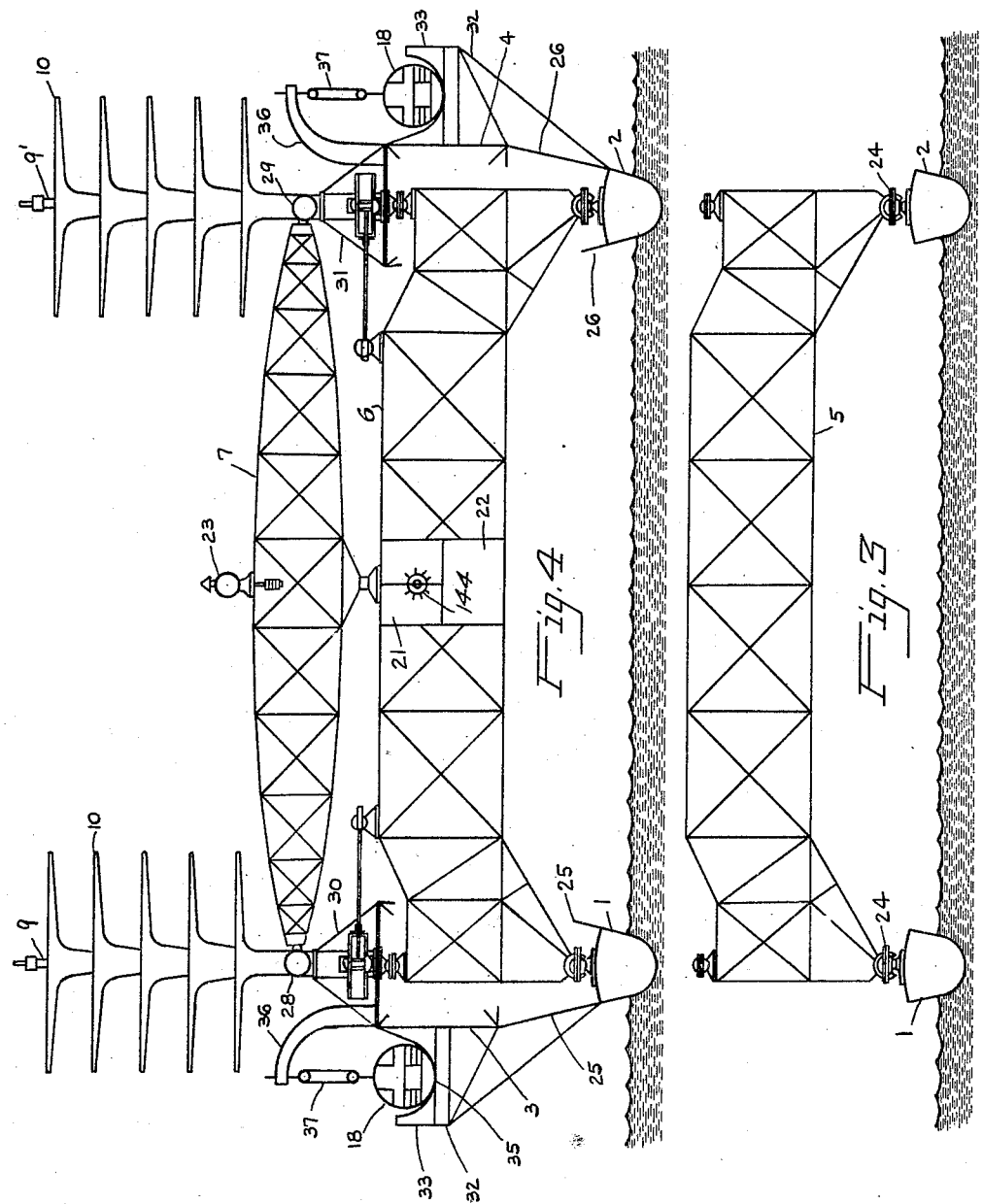

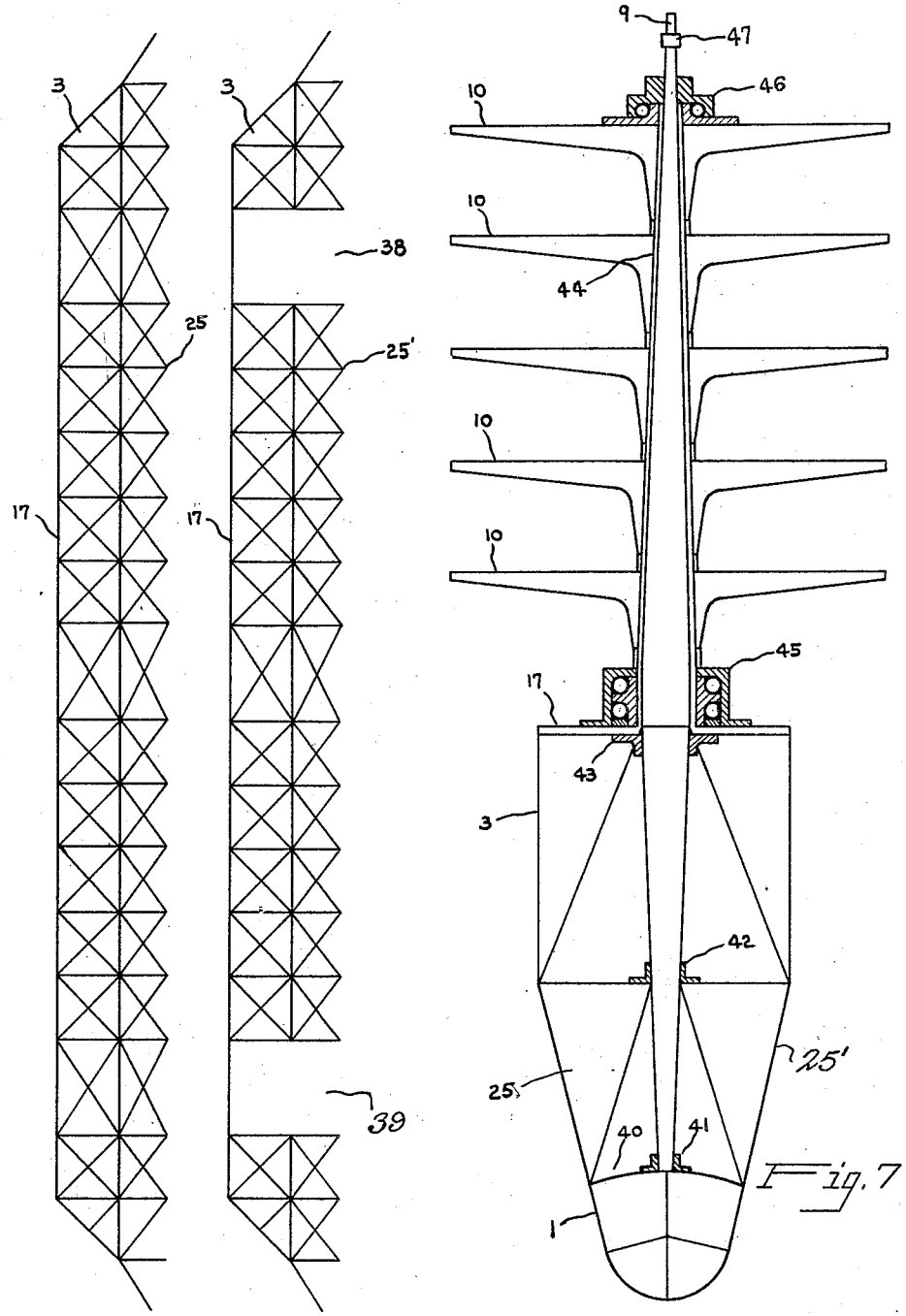

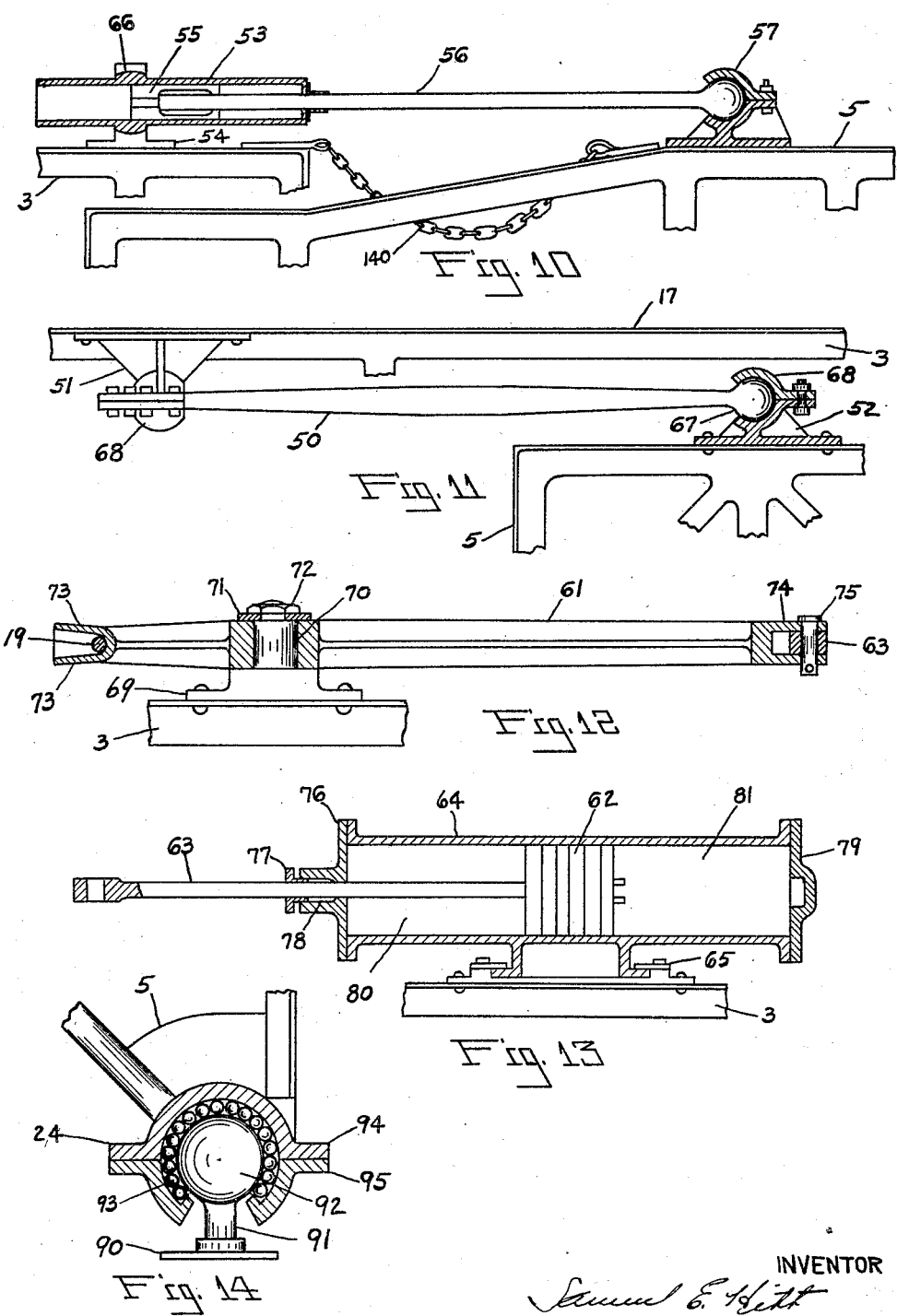

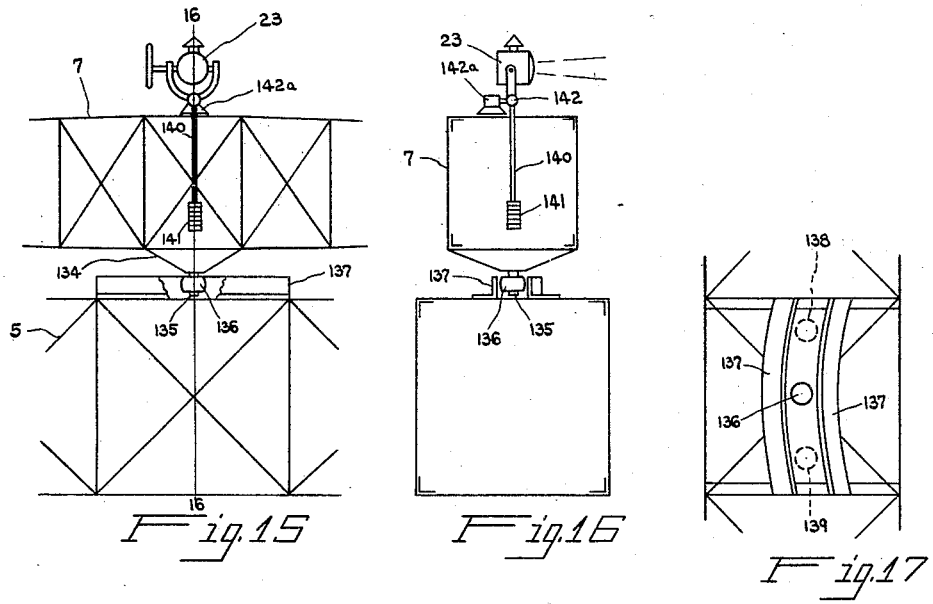
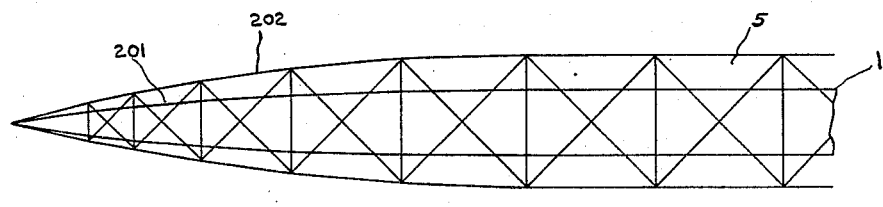
Fig. 21
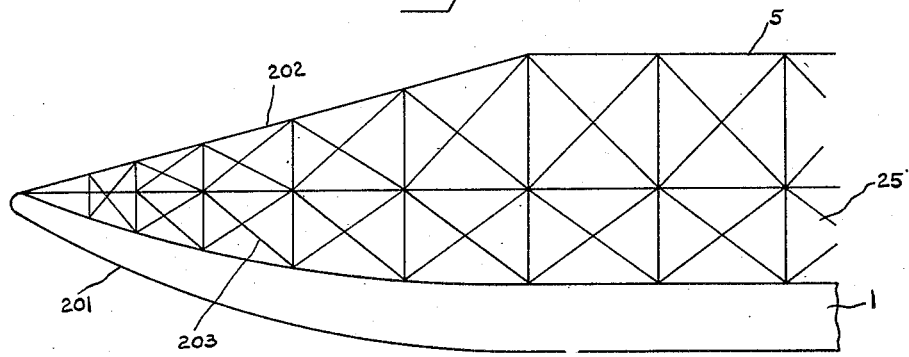
Fig. 22

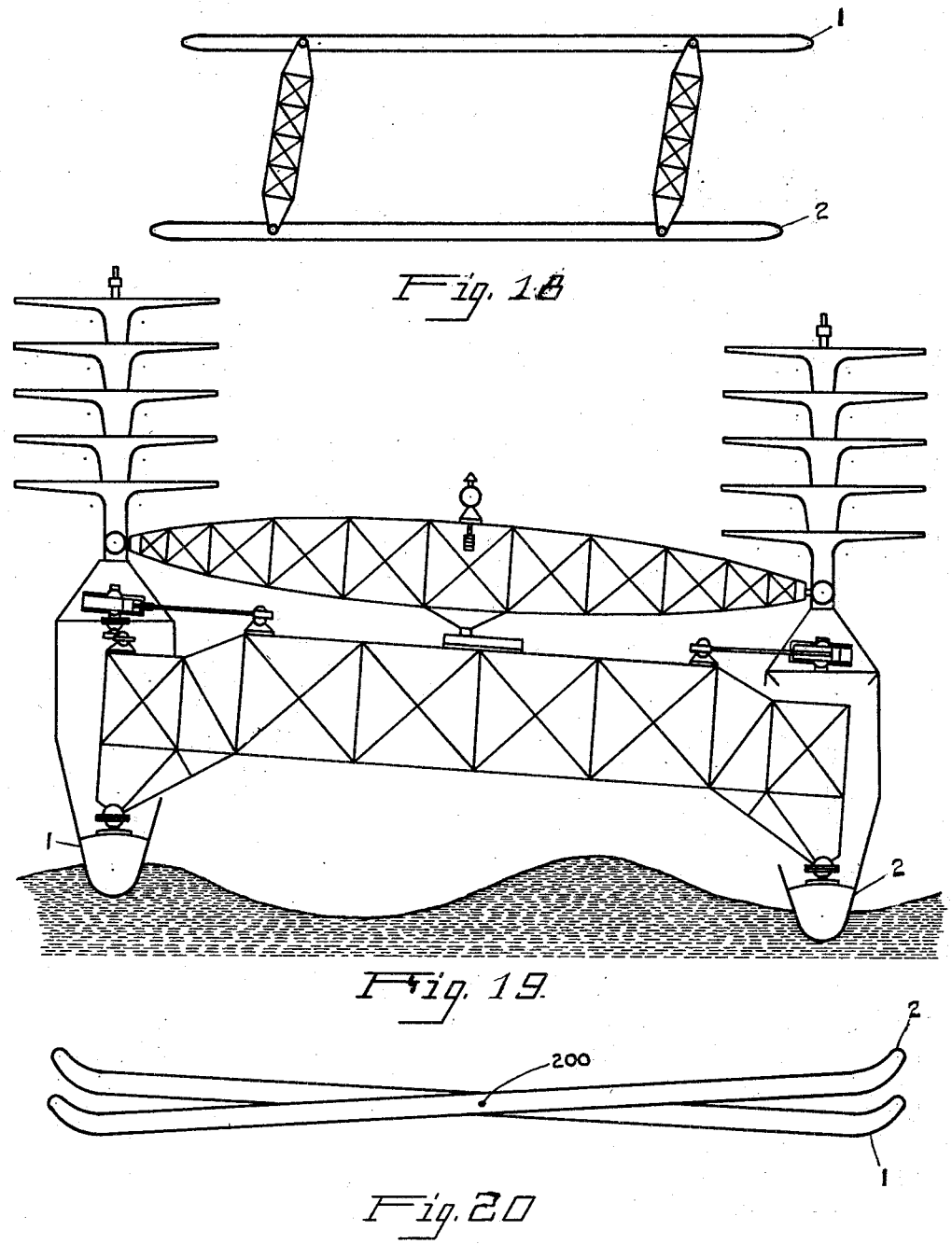

Patented Apr. 12, 1932

1,853,125

UNITED STATES PATENT OFFICE

SAMUEL E. HITT, OF ELYRIA, OHIO

TWO HULLED WATER CRAFT

Application filed March 26, 1928. Serial No. 264,634.

In its general objects, my invention aims to provide a watercraft which can readily be constructed and handled in such dimensions (both longitudinally and transversely) as to ride the waves even in stormy weather without overstraining any of its parts, and one in which air-lifted wings are continuously maintained in effective position to increase the buoyancy of the vessel and to reduce the pitching effect of waves on it.

Some of the more specific objects of my invention are as follows:—

To provide an aeroship (meaning a watercraft equipped with lifting wings or planes) that will ride out a storm safely, even if all the planes and motors are disabled.

To provide detachable cabins, hereinafter called life boat cabins, so that in case of wreckage, and the aeroship should sink, the cabins full of passengers will float away.

To provide an aeroship with motors aggregating 20,000 horse power, with a capacity of 1,000 passengers or more and a radius of 25,000 miles and speed of 200 miles per hour, or around the world in 10 days.

To provide an aeroship of such magnitude that it spans the crests of many waves not only fore and aft but also abeam, thereby assuring an even keel so that pitching of the vessel is reduced to a minimum and the lifting planes tilt fore and aft very little owing to the varying reactions of the seat against the ship.

To provide an aeroship with two hulls flexibly connected so that neither the hulls nor their connecting framework is overstrained due to the varying conditions of a rough sea.

To provide an aeroship with hulls of great length, about a thousand feet long, each hull supporting a superstructure of height and width sufficient to stiffen the hulls both laterally and longitudinally to give the hulls strength to withstand the impact of waves and to span from crest to crest of waves when the hulls are only partially submerged, i. e., when the hulls are floating on the crests and clear the troughs.

To provide flexible connections between the two hulls so that the hulls may have a considerable motion relatively one to the other longitudinally, vertically and rotatively.

To provide tension cables and air cushion connections between the two hulls so that varying head resistance against the hulls is equalized without overstraining the superstructures or connecting members.

To provide the two hulls with cross bridges fore and aft to keep the hulls approximately parallel and at the same distance apart.

To provide the hull superstructures with cross spanners to keep the superstructures or main frames approximately parallel and at the same distance apart.

To provide the aeroship with masts which carry lifting aeroplanes, the masts supported by the hulls and held in place by the hull superstructures.

To provide the superstructures or main frames over hulls with spanner connections directly over the bridge connectors, the spanners acting with the bridges as a parallel motion to keep the masts approximately parallel at all times.

To provide air cushion connections between the main hull frames and the bridges to keep the masts and frames automatically in approximately vertical position.

To provide radius arms between the main hull frames and the bridges to keep the bridges in approximately vertical position.

To provide universal swivel mounting for bridges and spanners to insure perfect flexibility.

To provide a duplex system throughout so that each hull is fully equipped with aeroplanes, fan motor units and steering gear.

To provide such universal swivel mountings with frictionless bearings to avoid the use of lubricants.

To provide an aeroship with diminishing resistance and increasing speed as the hulls rise out of the water.

To provide an aeroship which rises entirely out of the water of high speeds.

To provide an aeroship with tight hulls of honeycomb construction to be practically non-sinkable.

To provide an aeroship capable of carrying a power plant to furnish electric power for lighting and heating and an air compressor and suction pump for the longitudinal and cross equalizing cylinders.

To provide davits or other means for lowering the life boat cabins.

To provide platforms, elevators and stairways for access to life boat cabins and decks.

To provide ladders on the masts for the convenience of sailors and mechanics.

To provide cables from bow and stern of hulls to tops of masts to keep the masts in alignment and equally spaced and to equalize strains.

To provide booms fore and aft for cables from bow and stern of hulls to tops of masts for wing clearance.

To provide life boat cabins equipped as motor boats and fitted out with all modern conveniences, seats, chairs, berths, kitchen, dining, smoking, radio and wireless compartments.

To provide an aeroship for passenger service which can be converted for government use as an army transport.

To provide an aeroship for the Navy for the transportation of submarines at aeroplane speeds.

To provide powerful search lights fore and aft.

To provide starboard and port lights, according to marine regulations for other seagoing craft.

To provide means to prevent the spanners from rotating and to keep them in practically vertical position in order that the search lights may be mounted thereon.

To provide sealed lifeboat cabins with means for maintaining normal atmospheric pressure and humidity.

To provide sealed life boat cabins with means for heating and lighting.

To provide means for securing the life boat cabins to the aeroship and means for releasing such fastenings from within in times of danger.

To provide the search lights with universal mountings and pendulum or other counter weight to maintain the position as set and keep the light spotted in the direction desired.

It is also my intention to provide a mammoth transoceanic aeroship at a cost much less than that of present liners of the same passenger carrying capacity.

Referring to the drawings:—

Figure 9:
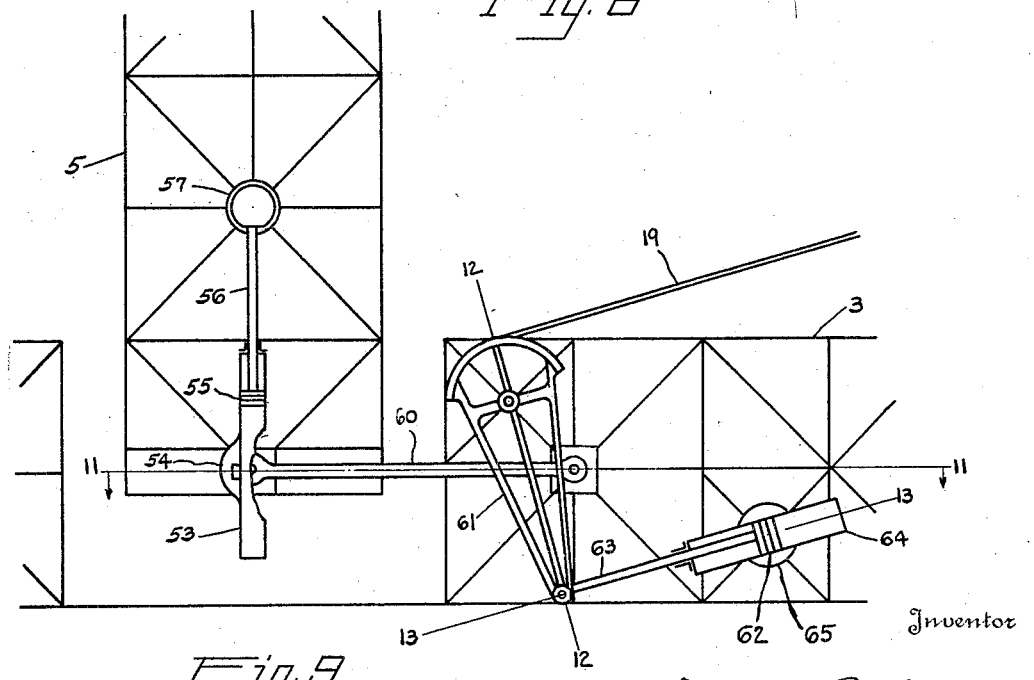

Fig. 1 is a general plan of my invention;
Fig. 2 is a general side elevation;
Fig. 3 is an elevation of hulls and bridge;
Fig. 4 is a sectional view on line 4—4 of Fig. 1;
Fig. 5 is an elevation of the outboard side of the superstructure of one of the hulls;
Fig. 6 is an elevation of the inner side of the superstructure of one of the hulls;
Fig. 7 is a sectional elevation of one of the duplex hull units, showing hull, superstructure, mast and wings;
Fig. 8 is a part plan of a main frame, bridge, cross equalizing cylinder and radius arm;
Fig. 9 is a part plan of a main frame, bridge, radius arm, cross equalizing cylinder and longitudinal equalizing cylinder;
Fig. 10 is a section on line 10—10 of Fig. 8;
Fig. 11 is a section on line 11—11 of Fig. 8, and also Fig. 9;
Fig. 12 is a section on line 12—12 of Fig. 9;
Fig. 13 is a section on line 13—13 of Fig. 9;
Fig. 14 is a sectional elevation of the universal step bearing between hull and bridge;
Fig. 15 is a front elevation of guide for spanner and also headlight and mounting;
Fig. 16 is a section on line 16—16 of Fig. 15;
Fig. 17 is a plan of guides for spanner roller;
Fig. 18 is a plan view showing relative movement of hulls longitudinally;
Fig. 19 is an end view showing relative movement of hulls vertically;
Fig. 20 is a side view showing relative movement of hulls rotatively;
Fig. 21 is a plan of a hull bow and framing;
Fig. 22 is an elevation of the same.

Referring to the drawings in detail wherein like characters of reference denote corresponding parts, in Fig. 1, 1 is the port hull and 2 is the starboard hull. The hull 1 carries a superstructure 3—25 and the hull 2 carries the superstructure 4—26, as shown in Fig. 4. The hulls 1 and 2 are connected by the fore bridge 5 and aft bridge 6. The superstructures 3—25 and 4—26 are connected by the fore spanner 7 and aft spanner 8. Generally, the aeroship is symmetrical about the center, both fore and aft and also abeam and can go backwards as well as forwards. 9 are the masts, upon which are rotatively mounted the wings 10. The masts 9 are rigidly mounted in the main frames 3 and 4 and are secured to the top plates of the hulls 1 and 2. The tops of the masts 9 are further held by a wire rope 11 passing over booms 12 and fastened at the bow at 14 and at the stern at 15 as shown in Fig. 2.

In Figs. 1 and 2, 16 are the fan motor units. They are placed on top of the frames 3 and 4, or upper decks 17 at the inner and outer sides of the deck to be clear of the slip stream from the masts. 18 are the life boat cabins for the passenger liner or submarines for the Navy transport. For the Navy transport, a large submarine can be carried above the water, underslung from the bridges. 19 and 19' are the longitudinal equalizing cables and 20 are the longitudinal limit cables or safety chains.

21 is the pilot house.
22 is the power house.
23 is the searchlight.

Fig. 3 shows the hulls 1 and 2 connected by the fore bridge 5, through the universal joints or bearings 24. The aft bridge 6 in Fig. 4, is mounted in like manner. The hulls 1 and 2 are reinforced by the main frames 3 and 4, of square prism form now planned 40 feet square and 900 feet long, the intermediate framework shown at 25 and 26.

The superstructure 3—25 and 4—26 are connected by the fore spanner 7 and aft spanner 8 through the universal and frictionless joints 28 and 29 mounted on the main frames 3 and 4 by the framework 30—31. Fore bridge 5 and fore spanner 7 and also aft bridge 6 and aft spanner 8, thus form a near parallel motion to keep the masts 9 on hull 1 approximately parallel to the masts 9' on hull 2. In other words, the hulls 1 and 2 and their superstructures 3—25 and 4—26 roll sideways together. Hulls 1 and 2 being about 20 feet deep, framing 25 and 26 about 30 feet high, and main frames 3 and 4 about 40 feet high, each hull unit constitutes a girder about 90 feet high and 900 feet long. Under normal conditions of running, even in a rough sea, only parts of the hulls 1 and 2 will be submerged up to the top plates and long stretches of the hulls, from crest to crest of waves, will be out of the water. The superstructures 3—25 and 4—26 are of great depth to withstand the strains caused by such severe stresses. In Fig. 4, the pilot house 21 is shown over the power house 22, and searchlight 23 above the spanner. 144 is the helm.

In Fig. 5, the outboard side of main frame 3 is shown supported by the framing 25. 17 is the upper deck.

In Fig. 6, the inner side of the main frame 3 is shown supported by the framing 25', parts being omitted at 38 for the fore bridge 5 and at 39 for the aft bridge 6.

In Fig. 7, the port main frame 3 is shown supported above the port hull 1 by the frame 25 and 25'. The masts 9 are mounted on the hull top plate 40 with flanges 41, on the main frame 3 with flanges 42 and on the upper deck 17 with flanges 43.

The wings 10 are carried by a sleeve 44 mounted on the mast 9 with frictionless bearings 45 and 46.

In Fig. 8, 3 is the port main frame. 5 is the fore bridge. 50 is the radius arm mounted on the main frame 3 by the universal joint 51 and on the bridge 5 by the universal joint 52. The radius arm 50 keeps the bridge approximately vertical. The bridge 5 and frame 3 are further connected by the air cushion cylinder 53 mounted on frame 3 at 54, the piston 55 and piston rod 56 being connected to bridge 5 by the universal joint 57.

This air cushion arrangement restrains the parallel motion of the bridge 5 and the spanner 7 and by means of the differential air system, automatically restores the connected members to their normal positions after disarrangement.

Cylinder 53 is under pressure from the compressed air line, sufficient to produce compression at end of stroke for ordinary movement of frame 3 and bridge 5. When the piston nears the end of its stroke, extra pressure is admitted to prevent the two structures from coming together, at the other end of the bridge.

The cylinders are of such length that the piston can not reach the end of the cylinder and knock out the head. Before this can occur, safety chains 140 come into play and stop further motion. The compression being in the piston rod end of cylinder, the piston rods 56 are under tension instead of compression.

When the hull units roll to port, the cylinder 53 on the port side is under compression as shown. When the hull units roll to starboard, the cylinder on the starboard side on the other end of bridge 5 is under compression. The same is true for aft bridge 6. Aft bridge 6 is connected to port frame 3 in the same manner.

In Fig. 9, the fore bridge 5 is shown connected to the port main frame 3 the same as before. The easement arrangement for tension cable 19 connecting the superstructures of the hulls 1 and 2 is here shown, the quadrant arm 61, piston 62, piston rod 63, cylinder 64, with its swivel mounting 65 on frame 3.

The cylinder 64 is also connected to the compressed air system by a differential valve arrangement which automatically restores normal conditions after the hulls 1 and 2 have become displaced, i. e., one ahead of the other.

In Fig. 10, 66 is the ball and socket joint between the cylinder 53 and its mounting 54 on frame 3. Piston rod 56 is here shown connected to the bridge 5 by the universal joint 57.

In Fig. 11, radius arm 50 carries at both ends, balls 67, fitting socket base 51 and cap 68 on frame 3 and socket base 52 and cap 68 on bridge 5.

In Fig. 12, the quadrant arm 61 is mounted on frame 3 by base 69, pin 70, washer 71 and nut 72. Quadrant flanges 73 form a groove for the tension cable 19, the lever end being forked at 74 for the piston rod 63 and pin 75.

In Fig. 13, cylinder 64 is secured to frame 3 by swivel mounting 65 and carries piston 62, piston rod 63, head 76, gland 77, stuffing box 78 and rear head 79.

When hull 1 advances ahead of hull 2, the piston 62 passes the center toward hull 2, compressed air is admitted and shut off, further motion causing the enclosed air to reach a compression sufficient to retard hull 1 and advance hull 2 reversing their relative motions. When normal conditions are restored and hulls 1 and 2 are exactly opposite one another, piston 62 is in central position of cylinder 64 and the compressed air is exhausted. When hull 2 advances ahead of hull 1, the cylinder directly opposite on hull 2 operates in a similar manner.

As there are two tension cables 19 and 19', there is always one cylinder operating to restore normal conditions.

A vacuum is maintained in the rear chamber 81 formed by the head 79 to provide enough pull to keep the tension rope 19 taut when the chamber 80 is exhausted.

In Fig. 14, the bridge 5 is supported on the hull 1 top plate by flange 90, post 91, bearing ball or sphere 92, friction balls 93, bridge bearing 94 and cap 95.

In Figs. 15 and 16, showing the central part of spanner 7 over the central part of bridge 5, 134 is a bracket on spanner 7, carrying pin 135 and roller 136, which runs in guides 137 on top of bridge 5.

In Fig. 17, the guides 137 are shown curved to the same radius as the radius arms 50 and placed opposite hand to compensate for the tilting of the bridge 5 fore and aft due to the radius arm 50 when the hull units roll sideways. The roller 136 is shown in extreme relative positions at 138 and 139.

The spanner 7 is thus kept from rotating in the universal mountings 28 and 29 and by means of the compensating curvature of the guides 137, is kept in practically vertical position.

In Figs. 15 and 16, the searchlight 23 is mounted on top of spanner 7 by the universal joint 142 and bracket 142a. The pendulum rod 140 and counterweight 141 keep the searchlight steady and affected less by the motion of the spanner 7.

The relative motion of hulls 1 and 2 "longitudinally" is shown in Fig. 18 when the port hull 1 leads the starboard hull 2. Also the relative motion of the hulls 1 and 2 "vertically" is shown in Fig. 19 when the port hull 1 rides the crest of a wave and the starboard hull 2 is in the trough and at a lower level, without rolling or listing of the hulls with their superstructures, an occasional and perhaps momentary condition. Also the relative position of the hulls 1 and 2 "rotatively" is shown in Fig. 20 when the bow of the port hull 1 is down and the bow of the starboard hull 2 is up and the two hulls can be said to rotate relatively about a center 200.

In Figs. 20 and 21, 1 is the hull, 5 the main frame, 25 the supporting framing, 201 the bow, 202 the main bow frame and 203 the bow supporting framing.

The pilot house is provided with:—

Mariner's compass, direct reading log gage, wind gage, indicators for angle of wing units, angle of fan motor units, hull displacement fore and aft, dip from horizontal for each hull, mast inclination from vertical, number of wings spread, barometer, thermometer, telescope, binoculars, telephone switch board, radio and wireless telegraph sending and receiving apparatus and control boards.

The operation of my invention is as follows:—

The aeroship sailing out of the harbor under its own power, the hulls 1 and 2 are about half submerged, i. e., the aeroship draws about ten feet of water.

The aeroship is harbored in an inlet or bay and starts out in comparatively smooth water, so that top plates of hulls will not be subjected to more than a light wash.

With several miles start before reaching the ocean, the aeroship gets under way and by the time a rough sea is encountered, the hulls 1 and 2 are almost out of the water and derive all the steadying effect from the sea desired by skipping through the tops of the waves.

Under these conditions, the top plates of hulls 1 and 2 are not lower than the crest of wave level and wash against the supporting framework 25 and 26 is reduced to a minimum.

The head resistance due to the displacement required for normal speeds and that due to impact of the waves is reduced to a minimum by the small cross section of the hulls 1 and 2. The head resistance is further reduced by the bow construction of hulls 1 and 2, shown in Figs. 1, 2, 21 and 22.

The hulls are of great length, being about a thousand feet long, which insures an even keel even when running under such adverse conditions.

The hulls 1 and 2 have a fan shaped section, as shown in Fig. 7, so that their lifting power or buoyancy increases very rapidly as they sink in the water or dip into a wave.

On account of the flexible connection of the hulls and the automatic operation of the air cylinders, the hull units may roll from side to side or one hull may lead the other temporarily for a few feet without causing the aeroship to deviate from its course and without causing severe strains upon the structure.

On coming into port, the course is laid out to enter a large harbor, bay or inlet so that in coming from a rough sea, the pilot has several miles of smoother water in which to reduce speed and to allow the aeroship to settle down gradually before coming to anchor.

The hatches on top of the life boat cabins are opened, gang plank is placed to upper deck 17, the passengers emerge and are transferred to a passenger boat. Transfer can be made from the upper deck 17 at top of main frame 3 or 4 or from the main deck at bottom level of frames 3 or 4 or from top of hulls 1 and 2, depending on the size of the boat that takes them off.

The term "hull unit" hereinafter used is to designate one hull with its superstructure.

It is apparent that the embodiment of the invention which I have described in detail possesses all the features of advantage enumerated as desirable in the statement of the invention and the above description. It is also evident that numerous changes in the details of construction and in the combination and arrangement of parts may be resorted to, without departing from the spirit and scope of the invention as hereinafter claimed, without sacrificing any of its advantages.

Having thus described my invention, what I claim as new is:

1. In an aeroship or similar craft, the combination of two hulls flexibly connected by bridges, the said hulls carrying superstructures and radius arms between the said bridges and the said superstructures, to keep the said bridges practically in vertical position.

2. In an aeroship or similar craft, the combination of two hulls flexibly connected by bridges, superstructures over the said hulls and air cushion cylinders between the said bridges and the said superstructures to restore normal conditions after disarrangement.

3. In an aeroship or similar craft, the combination of two hulls flexibly connected and held at practically the same distance apart, diagonal tension cables connecting the hull units fore and aft and air cushion cylinders at one end of the said cables to restore normal conditions after disarrangement.

4. In an aeroship or similar craft, the combination of two hull units flexibly connected and held at practically the same distance apart, diagonal tension cables connecting the said hull units fore and aft, one end of each of the tension cables connected to an air cushion cylinder by means of a quadrant arm, piston rod and piston, substantially as specified.

5. In an aeroship or similar craft, the combination of two hulls flexibly connected by bridges, superstructures over the said hulls, spanners the same length of the bridges flexibly connected to the said superstructures, masts carried by the hulls and hull superstructures, the said bridges and spanners acting as a near parallel motion to cause the masts to roll together and to be nearly parallel under all conditions.

6. In an aeroship or similar craft, the combination of two hulls reinforced longitudinally and transversely by superstructures, bridges and spanners between the said hulls and superstructures forward and aft, and universal mountings between the said hulls and superstructures and the said bridges and spanners to form a near parallel motion to maintain the hulls practically at a fixed distance apart; the universal mountings being constructed to permit relative motion between the hulls longitudinally, vertically and rotatively.

7. In an aeroship or similar craft, the combination with two hulls flexibly connected by bridges and spanners, of pneumatic means for automatically restoring normal relative positions of the said hulls after disarrangement.

8. In an aeroship or similar craft, the combination with two laterally spaced hulls, of bridges and spanners connecting the two hulls, the bridges and spanners being operatively connected through universal joints to both hulls, guides fast upon the bridges, and rollers mounted on the spanners and disposed for engagement by the guides to prevent the spanners from revolving and to maintain the spanners in substantially constant vertically positions.

9. In an aeroship or similar craft, the combination of two hulls flexibly connected by bridges and spanners, radius arms connecting the said hulls with the said bridges, and rollers mounted on the said spanners to run between guides mounted on the said bridges to prevent the said spanners from revolving and to maintain the said spanners in practically vertical position, substantially as specified.

10. In an aeroship or similar craft, two laterally spaced hull units, each consisting of a hull and a superstructure rising therefrom, bridges connecting the said hulls, spanners connecting the said superstructures at higher elevation than the bridges, the said bridges and the said spanners being all of equal length; universal joints between the said bridges and each hull, and between the spanners and each superstructure, the bridges and the spanners affording a substantially parallel motion connection between the hull units to allow the hull units to roll together and to keep them nearly parallel at all times.

11. In an aeroship or similar craft, two laterally spaced hull units, each consisting of a hull and a superstructure rising therefrom, bridges connecting the said hulls, spanners connecting the said superstructures at higher elevation than the bridges, the said bridges and the said spanners being all of equal length; universal joints between the said bridges and each hull, and between the spanners and each superstructure, the bridges and the spanners affording a substantially parallel motion connection between the hull units to allow the hull units to roll together and to keep them nearly parallel at all times; and yielding means interposed between each bridge and each superstructure, the said means continually tending to keep the medial longitudinal planes of both hulls at right angles to imaginary straight lines connecting the universal joints at opposite ends of each bridge.

12. An aeroship or similar craft as per claim 11, in which each of the yielding means includes an air cylinder mounted on the superstructure of one hull, and a piston connected to a bridge.

In testimony whereof I affix my signature.

SAMUEL E. HITT.